March 12, 1935.  C. P. GALANOT  1,994,084
HOIST BODY FOR VEHICLES
Filed Dec. 5, 1929   11 Sheets-Sheet 3

INVENTOR
Camille P. Galanot
by his attorneys
Byrnes, Stebbins, Parmelee & Blenko March 12, 1935.  C. P. GALANOT  1,994,084
HOIST BODY FOR VEHICLES
Filed Dec. 5, 1929   11 Sheets-Sheet 6

INVENTOR
Camille P. Galanot
by his attorneys
Byrnes, Stebbins, Parmelee & Blenko March 12, 1935.

C. P. GALANOT 1,994,084

HOIST BODY FOR VEHICLES

Filed Dec. 5, 1929

INVENTOR
Camille P. Galanot
by his attorneys
Byrnes, Stebbins, Parmelee & Brenko March 12, 1935.  C. P. GALANOT  1,994,084
HOIST BODY FOR VEHICLES
Filed Dec. 5, 1929  11 Sheets-Sheet 8

INVENTOR
Camille P. Galanot
by his attorneys
Byrnes, Stebbins, Parmelee & Blenko

March 12, 1935.  C. P. GALANOT  1,994,084
HOIST BODY FOR VEHICLES
Filed Dec. 5, 1929   11 Sheets-Sheet 9

INVENTOR
Camille P. Galanot
by his attorneys
Byrnes, Stebbins,
Parmelee & Blenko March 12, 1935. C. P. GALANOT 1,994,084
HOIST BODY FOR VEHICLES
Filed Dec. 5, 1929 11 Sheets-Sheet 10

INVENTOR
Camille P. Galanot
by his attorneys
Byrnes, Stebbins, Parmelee & Blenko Patented Mar. 12, 1935

1,994,084

UNITED STATES PATENT OFFICE 1,994,084

HOIST BODY FOR VEHICLES

Camille P. Galanot, Youngstown, Ohio, assignor to The Commercial Shearing & Stamping Company, Youngstown, Ohio, a corporation of Ohio Application December 5, 1929, Serial No. 411,777

5 Claims. (Cl. 298—18)

My invention relates to a hoist for dumping bodies for vehicles and, in particular, to a dumping body for motor trucks which is capable of dumping on both sides and to the rear of the truck chassis.

The present invention is an improvement on the structure described in my United States Patent No. 1,909,341, and is broadly covered by claims of my copending application Serial No. 512,289, which is a division from the application for said patent.

Three-way dump truck bodies have been known heretofore, but all the types with which I am familiar have been characterized by a number of serious disadvantages. Dump trucks as constructed at present are provided with a sheet metal bottom or floor, which is subject to considerable battering in ordinary use. These truck bodies are usually provided with hinged gates, of which the tail gate has been journalled in corner posts and has swung from the top thereof. The corner posts themselves offer an obstruction to the free dumping of the contents of the truck, and the operation of this type of gate is unsatisfactory in other respects.

I have invented a dumping body which is characterized by the absence of corner posts, both the side and rear gates being hinged to the body below the floor sheet thereof. This construction eliminates disadvantages introduced by the corner posts, as pointed out above. The invention contemplates also a body bottom which is characterized by extremely high resistance to battering and unusual durability, even under the severest usage. For operating the gates of the dumping body, I have provided a novel form of mechanism, which automatically opens the gate on the side to which the truck is dumping, or the rear gate if the truck is dumping to the rear. The novel features hereinabove mentioned, as well as the others which will appear more fully from the following description, improve the operating efficiency and the period of usefulness of devices of the type mentioned.

The invention comprises a vehicle body adapted to be mounted on a variety of sizes and types of vehicles so as to be tiltable about several axes to dump the contents of the truck body in the desired location. The body is supported from the chassis of the vehicle at four points and is arranged to be tilted about two of said points at a time so as to cause dumping to either side and to the rear of the vehicle. The engagement of the body with the supporting means at said points is obtained by sliding, locking bars under the control of the operator of the vehicle. Lifting means, such as a multiple cylinder and piston arrangement, is trunnioned to the vehicle chassis and engages the bottom of the body for tilting the latter about the various dumping axes.

The gates on the sides and at the rear of the body are provided with means for automatically opening them when the body is tilted in the dumping direction. Locking means are also included to prevent the opening of the gates in any direction except that toward which the body is tilted. These means are controlled by the same mechanism which determines the direction of dumping. The automatic gate-opening means are effective when the truck body is lowered to normal position to close the gates firmly.

The remaining details of the structure of the present invention will be fully explained during the course of the following description which refers to the accompanying drawings.

In the drawings, which illustrate a present preferred embodiment of the invention.

Figure 18:
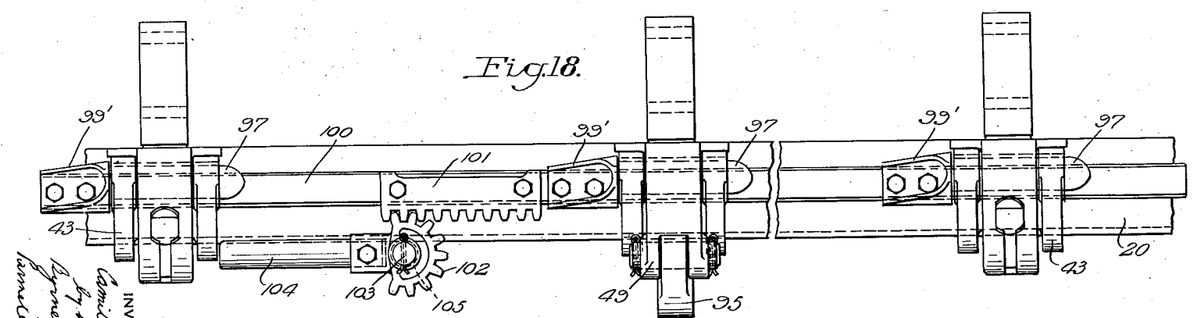
Figure 18 is an enlarged side elevation of the tail gate locking mechanism.
Figure 19:
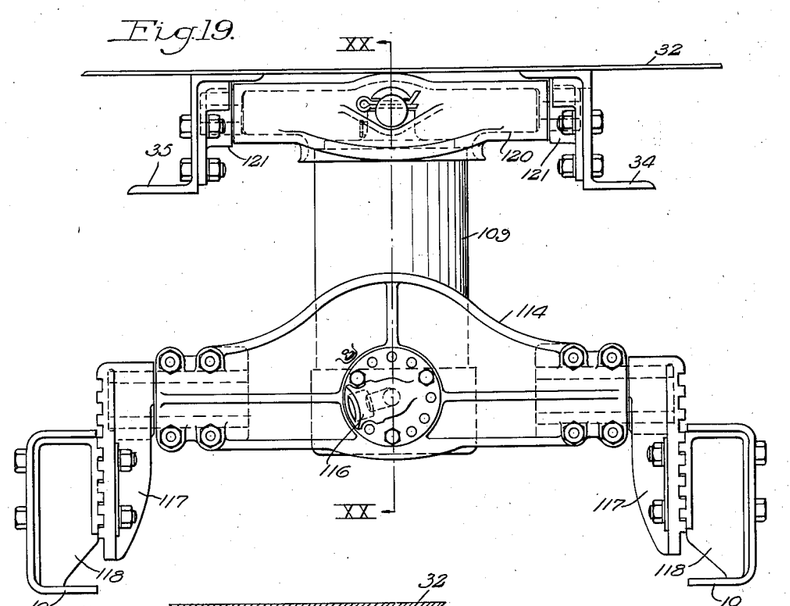
Figure 19 is a view, with parts broken away, showing the hoist mechanism proper.
Figure 20:
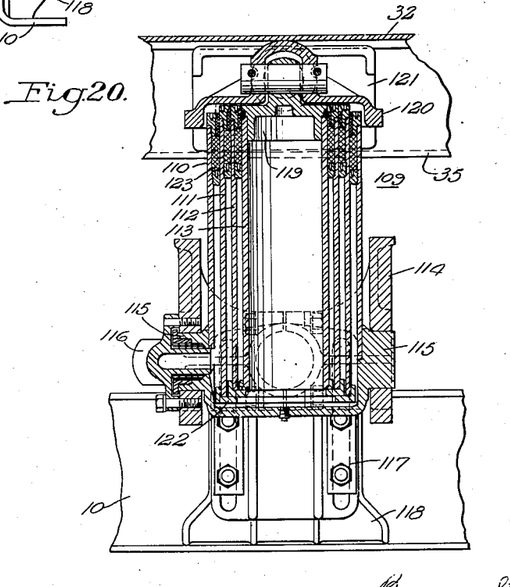
Figure 20 is a sectional view, taken along the plane of line XX—XX of Fig. 19.

In order to simplify the description, it will be divided into sections relating specifically to certain elements of the invention. The order of the description will be somewhat as follows: (1) The body proper (Figs. 1-5 and 21); (2) The body locking and control mechanism (Figs. 6-9); (3) The side gate operating and locking mechanism (Figs. 10, 12, 14, and 17); (4) The tail gate operating and locking mechanism (Figs. 11, 13, 15, 16, and 18); and (5) The hoist proper (Figs. 19 and 20).

Referring in detail to the drawings, the body proper may best be observed in Figs. 1-5 and will be described with particular reference thereto.

Figure 1:
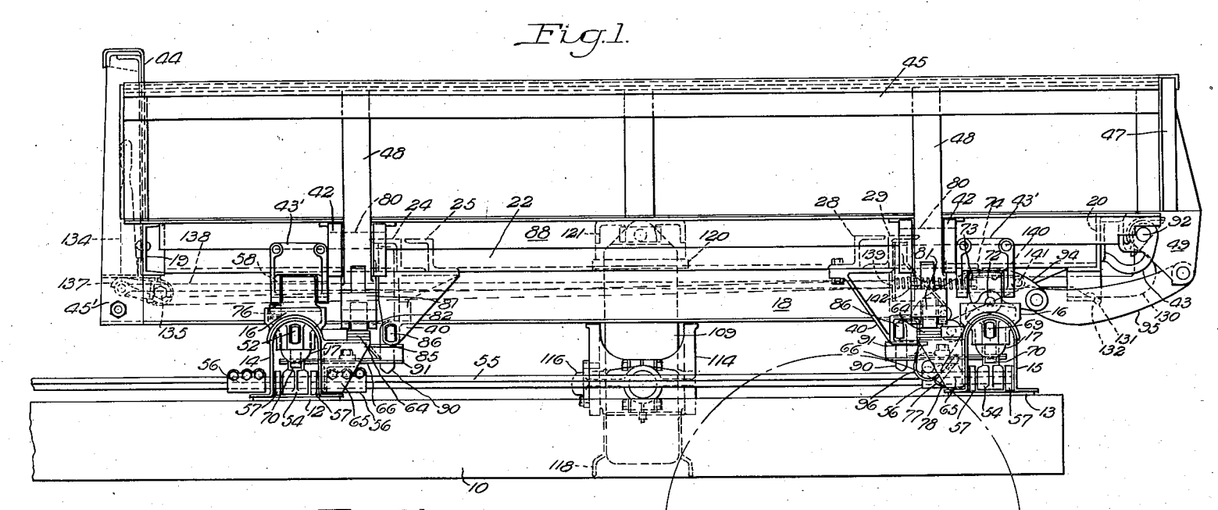
Figure 1 is a side elevation of a hoist body as it appears mounted on the chassis of a motor truck.

Fig. 1 illustrates the longitudinal channels 10 of a truck chassis of any type, the rear wheels being shown in outline at 11. Bearing plates 12 and 13 are secured to the top of the chassis at points adjacent the middle and rear ends thereof. Front and rear cross members or bolsters 14 and 15 rest upon the bearing plates 12 and 13. The cross members 14 and 15 are of arcuate cross section and provide a housing for the mechanism which locks one side or the rear of the body to the chassis for dumping, while permitting the elevation of the other sides.

Adjacent their ends, the front and rear cross members are provided with hinge-pin cups 16. These cups are adapted to receive hinge pins 17, which are pivotally supported from the body bottom.

Figure 2:
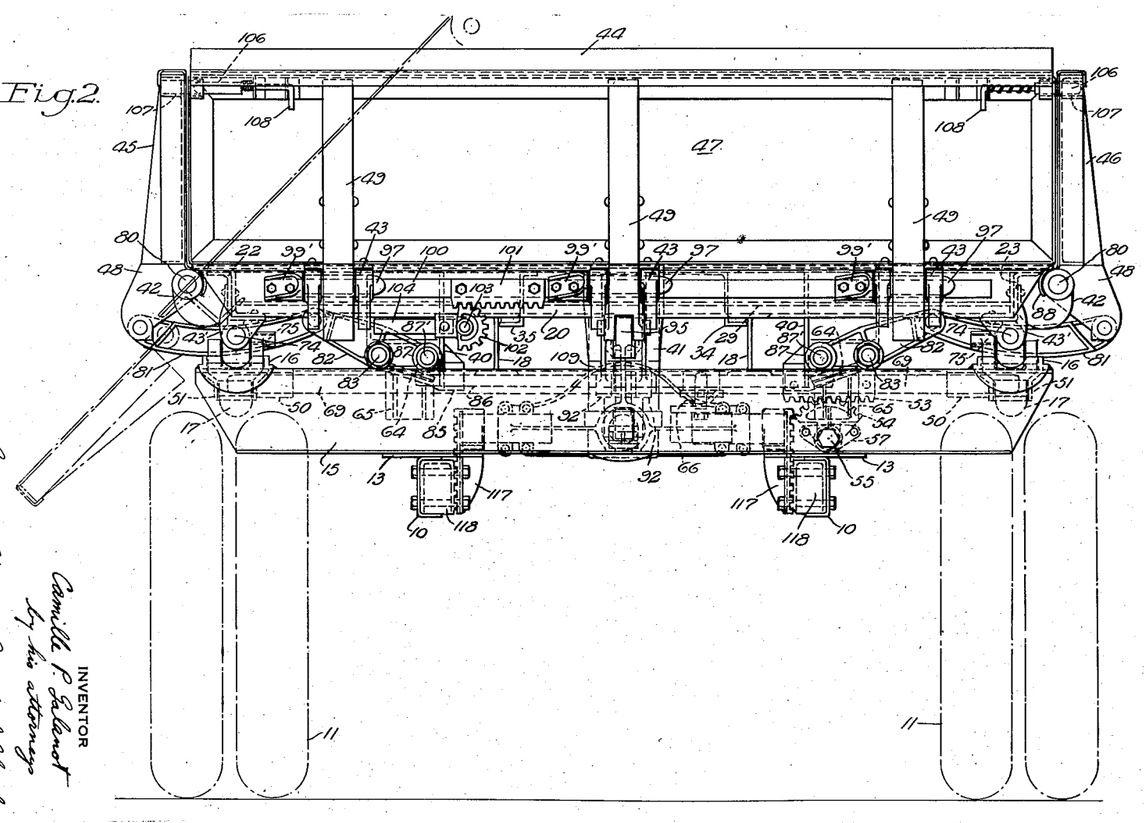
Figure 2 is a rear view of the body and vehicle shown in Fig. 1.
Figure 3:
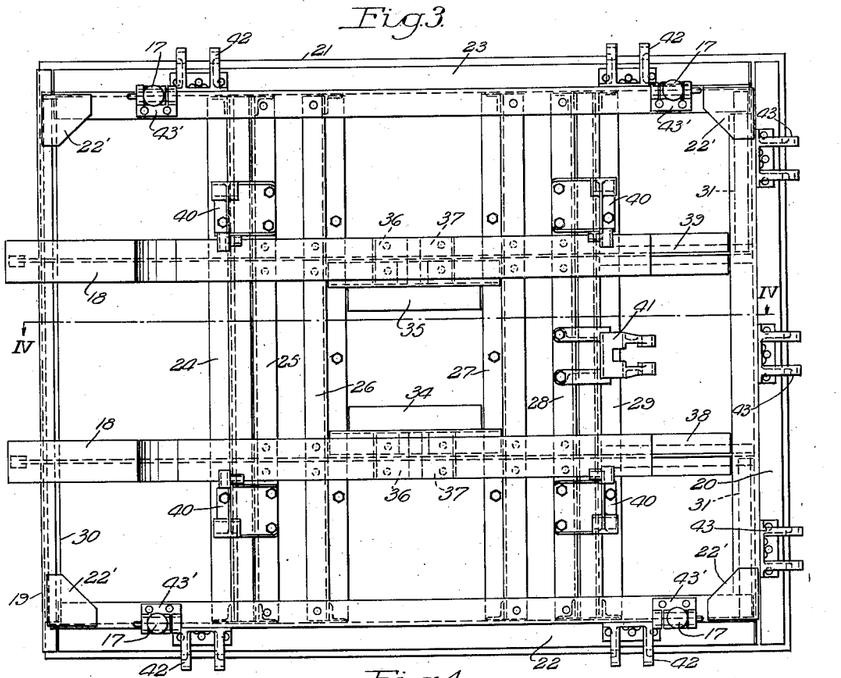
Figure 3 is a bottom plan view of the body with all the gate-operating and locking mechanism removed therefrom.
Figure 4:
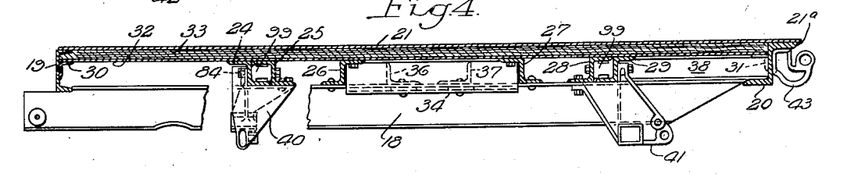
Figure 4 is a sectional view of the body bottom, taken at a plane indicated by the line IV—IV of Fig. 3.
Figure 5:
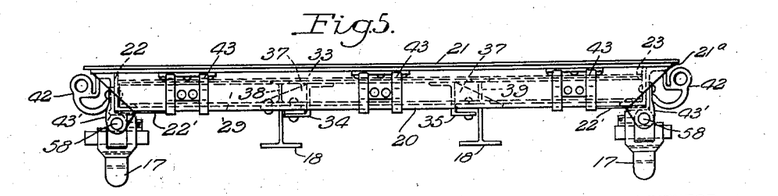
Figure 5 is an end elevation of the structure of Fig. 3, such as would be seen by looking at the right-hand thereof.

The body bottom is illustrated in detail in Figs. 3, 4, and 5. The body comprises a pair of I-beams 18, which extend lengthwise of the body. A front channel 19 and a rear Z-bar 20 extend transversely of the I-beams 18. A body sheet 21, forming the floor of the body, overlies the upper flanges of the front channel and rear Z-bar. The sides of the body bottom are formed by the longitudinal Z-bars 22 and 23, which may be seen in Figs. 2 through 5. The sheet 21 has square edges, extends beyond the channel 19 and the Z-bars, and is reinforced by a fillet 21a of metal welded to the flanges of the structural members and to the lower surface of the sheet. Gusset plates 22' connect the lower flanges of the front channel 19, the rear Z-bar 20, and the side Z-bars 22 and 23. Intermediate Z-bars 24, 25, 26, 27, 28, and 29 of lesser height extend transversely of the I-beams 18 and are secured thereto. The intermediate Z-bars, together with angle brackets 30 and 31 secured to the webs of the front channel 19, and the rear Z-bar 20, constitute a support for a false bottom 32 between the flanges of the channel 19 and the Z-bars 20, 22, and 23. Between the false bottom 32 and the body sheet 21, I place a plurality of wooden filler members 33, which extend longitudinally of the body. This wooden filler between the body sheet and the false bottom serves to take up the shock which would ordinarily be spent on the floor sheet when a load of material is dumped into the truck from a steam shovel or storage hopper. The location of the false bottom within the height of the body bottom provides an exceedingly strong and durable structure.

Additional Z-bars 34 and 35 extend longitudinally of the body and their flange is secured to the upper flange of the I-beams 18, as shown in Fig. 5, a spacer block being inserted between the adjacent flanges. The ends of the Z-bars 34 and 35 are cut out to fit around the flanges of the Z-bars 26 and 27. Angle plates 36 and 37 are secured to the upper flange of the I-beams 18 between the intermediate Z-bars 26 and 27. Short I-beam sections 38 and 39 overlie the rear portions of the I-beams 18 and afford additional support for the bottom 32. These sections have their ends suitably shaped to fit around the flanges of the Z-bar 29 and the angle bracket 31. The Z-bars 26, 27, 34, 35, and the angle plates 36 and 37 constitute a bearing for the hoist proper, which will be described in detail later.

Castings 40 are secured to the Z-bars 24, 25, 28, and 29, as shown in Figs. 3 and 4. These castings provide bearings for the side gate operating and locking mechanism and will be the subject of further explanation. A casting 41 is secured to the Z-bars 28 and 29 intermediate castings 40 attached thereto, which cooperates with the operating mechanism for the tail gate, which will also be discussed hereafter.

Bearings 42 for the side gates are secured to the webs of the side Z-bars 22 and 23. Similar bearings 43, for the tail gate, are attached to the web of the rear Z-bar 20. Bearing brackets 43' are secured to the web and bottom flange of the side Z-bars 22 and 23. These brackets provide a bearing for the hinge pins 17, as shown in Fig. 5, the specific arrangement of which will be described in detail hereinafter.

Figure 21:
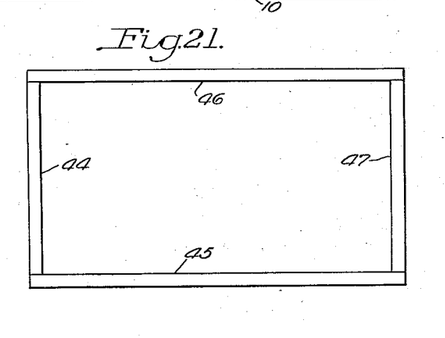
Figure 21 is a plan view of the body alone, showing diagrammatically the cooperation of the side and end walls.

In addition to the body bottom already described in detail and the body and gate and operating and locking mechanism referred to briefly, the body includes a front end wall 44, having downward projections 45' which are secured to the webs of the I-beams 18. The sides of the vehicle body are constituted by the side gates 45 and 46, and the rear wall by the tail gate 47. The side gates 45 and 46 are provided with downward projections 48 for cooperating with the bearings 42, while the tail gate has depending portions 49 for cooperating with the bearings 43. The relative positions of the end wall, side and rear gates, are shown in Fig. 21. The gates close tightly and form a substantially non-leaking body. There are no corner posts to obstruct the dumping of material from the body.

*The body locking and control mechanism*

The apparatus for locking the body in position for tilting to a dumping angle is illustrated in Figs. 6 through 9, although the general arrangement of the parts is also indicated in Figs. 1 and 2.

Figure 6:
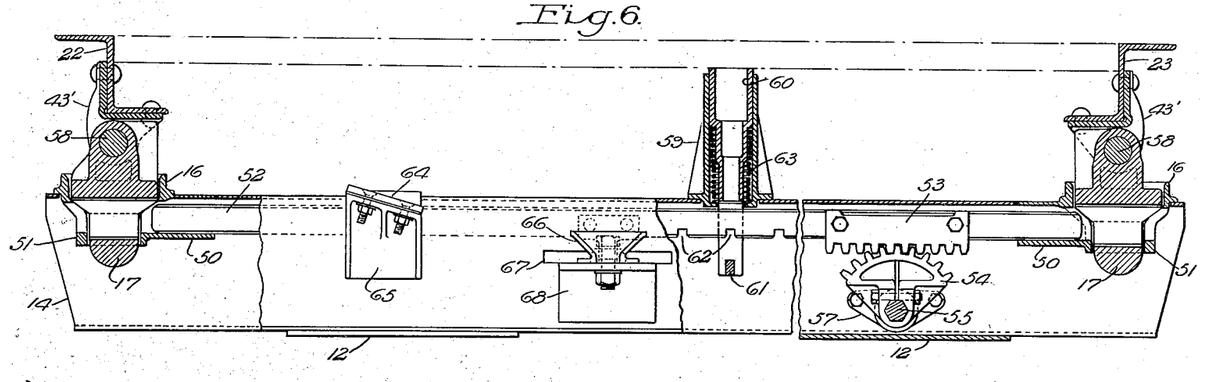
Figure 6 is a side elevation, with parts in section, of a transverse member which rests on the chassis of the truck and supports the front end of the body.

Fig. 6 illustrates the front cross member 14 and its associated elements. An opening is formed at the end of this cross member in its top portion and the hinge-pin cups 16, having the projecting sleeves 50, are welded thereto. The depending necks 51 of the cups have a transverse opening for receiving a front locking member 52, which slides in the sleeves 50 within the cross member 14. The front locking member 52 is provided with a rack bar 53 which is engaged by a gear segment 54 on a hexagonal shaft 55. As may be observed in Fig. 1, the shaft 55 extends the length of the truck and, though it is made up of several sections, these are rigidly connected by means of the couplings 56. Bearings 57, secured to the side wall of the cross member 14, support the section of the shaft 55 which traverses said cross member.

The shaft 55 is equipped with a forward extension (not shown) which is provided with operating means within the operator's cab of the truck. This provision enables the operator to turn the shaft in a direction to shift the front locking bar 52 so that it enters the opening in the neck 51 of the cup 16 and the corresponding hole in the hinge pin 17. By turning the shaft 55 to the right or to the left, the operator can positively lock the hinge pins on either side of the body to the undercarriage. While the hinge pin on one side of the body is thus locked, the pin on the other side is free to move out of its cup as the body is lifted by the hoist.

The rotation of the body takes place about an axis passing through a pivot pin 58, which is journalled in the upper portion of the hinge pin 17 and supports the bearing bracket 43', which carries the weight of the body.

A safety device is provided to prevent the shifting of the locking bar 52 while the vehicle body is raised. This device consists of a vertical sleeve 59 secured to the cross member 14. Within the sleeve 59, a hollow pin 60 is reciprocably arranged. The pin 60 has a downward projection 61, which is adapted to engage slots 62 in the front locking bar 52. A spring 63 urges the pin 60 upward, but as long as the vehicle body is in normal position, the body bottom forces the downward projection 61 away from the slots 62. As soon as the body is slightly tilted, the projection 61 enters one of the slots 62 to prevent further movement of the member 52 until the body is again lowered.

An inclined-cam surface 64 is secured to a bracket 65, which is mounted on the cross member 14. A similar cam member is mounted on the opposite side of the cross member but is not shown, since that portion thereof is broken away. A side gate locking arm 66 projects rearwardly through a slot 67 in the vertical wall of the member 14. The arm 66 is pivotally supported on a bracket 68 secured to the member 14 below the slot 67.

Figure 7:
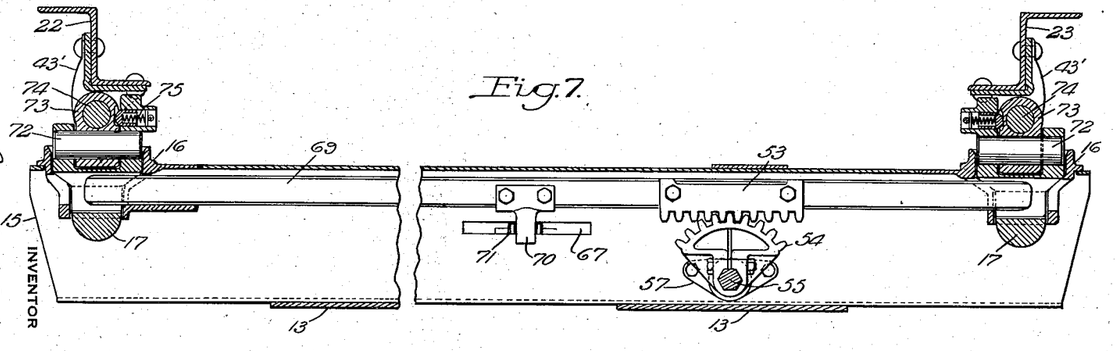
Figure 7 is a longitudinal section of a similar structure, which supports the rear end of the body.

Fig. 7 is a view similar to Fig. 6 except that it illustrates the rear cross member assembly. The cross member 15 supports hinge-pin cups 16 in the manner already described in connection with Fig. 6. The structure shown in Fig. 7 is similar in general to that of Fig. 6, but has a few additional details. It will be observed that the rear locking member 69, corresponding to the front locking member 52, engages both the hinge pins 17 at either end of the cross member 15 simultaneously when the locking member 69 is centrally positioned. This member is so dimensioned that it may be actuated in either direction so as to release one of the hinge pins 17. Normally, however, it secures both the hinge pins 17 to the cross member 15.

Figure 14:
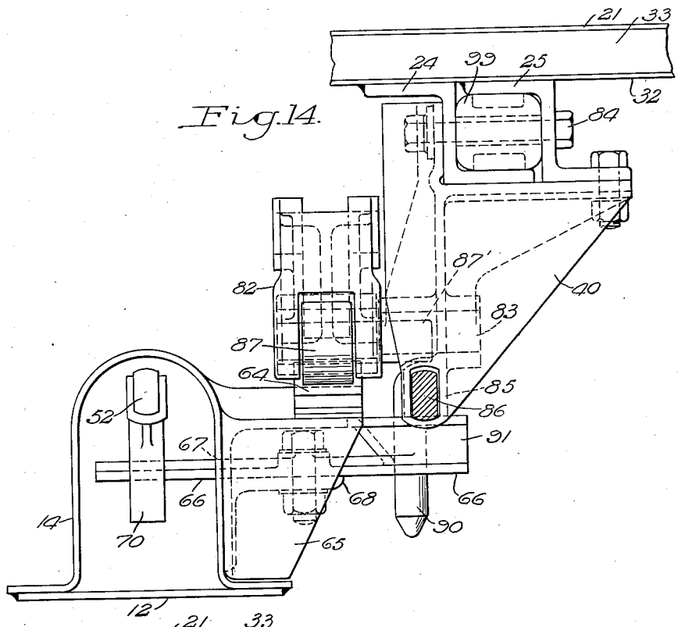
Figure 14 is an end view, partly in section, of the front transverse member and its associated side gate-operating and locking mechanism.
Figures 15, 16:
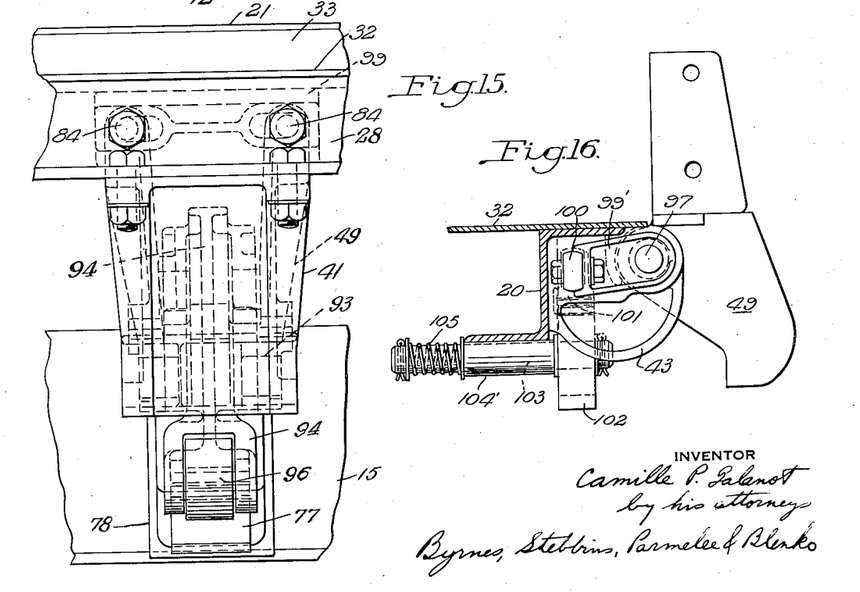
Figure 15 is a partial end view of the structure of Fig. 11, looking toward the left of the latter.
Figure 16 is a partial section taken through the tail gate locking mechanism.

The locking member 69 is operated through the shaft 55 by mechanism identical with that described for the operation of the member 52. A downwardly projecting finger 70 is secured to the locking member 69 for cooperation with the inner end of a side gate locking arm 71, similar to that shown at 66 in Fig. 6. The arrangement of these elements on the cross members 14 and 15 is identical and the showings of the two figures will explain the details of the structure. The operation will be the subject of further explanation.

The hinge pins 17, cooperating with the rear cross member 15, differ slightly from those which engage the front cross member 14. The upper portion of the former affords a journal bearing for a pivot shaft 72, which carries a pivot block 73. A second pivot shaft 74 extends through the pivot block 73 and the bearing 43' secured to the side Z-bar 22. A similar structure supports the bearing bracket 43', which is secured to the side Z-bar 23. Spring-pressed detents 75 maintain the hinge pin 17 in fixed position with respect to the axis of the shaft 74 when the pins are lifted from their cups in the dumping operation.

Figure 8:
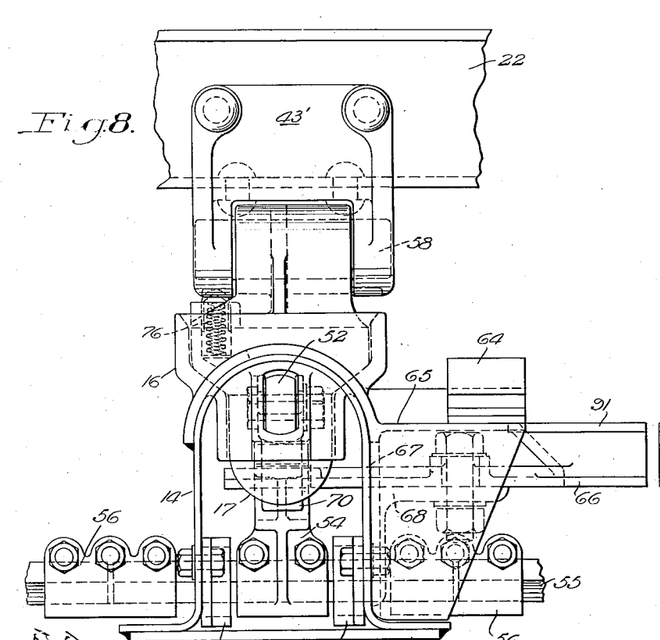
Figure 8 is an end elevation of the structure of Fig. 6.
Figure 9:
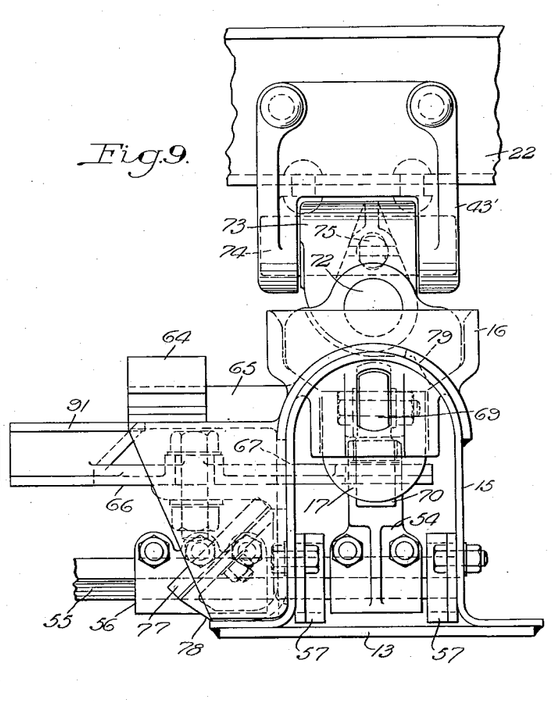
Figure 9 is an end elevation of the showing of Fig. 7.

Additional details of the structure shown in Figs. 6 and 7 may be seen in Figs. 8 and 9, which are end views, respectively, thereof. In Fig. 8, for example, may be seen a spring-pressed detent 76, which engages a recess in the bearing bracket 43' to maintain the front pin 17 in proper position relative to its cup 16 when the truck body is tilted to either side or to the rear.

Fig. 9 shows an inclined-cam surface 77 secured to the bracket 78, which is attached to the vertical front wall of the rear cross member 15. This cross member is also provided with an inclined-cam surface 64 mounted on a bracket 65. The arrangement of the pivoted side gate locking arm 66 in Fig. 9 is similar to that shown in Fig. 8 and requires no additional description, similar reference numerals beng employed to indicate corresponding elements, as in Figs. 6 and 7.

Fig. 9 also indicates how the rear portion of the cups 16, secured to the cross member 15, are slotted, as indicated at 79, so as to avoid interference with the bearing bracket 43' when the truck is tilted about the pivot shaft 72 to effect a rear dumping.

It will be obvious that when the shaft 55 is in the neutral position, the locking members 52 and 69 will be positioned for rear dumping, that is to say, the pins 17, engaging the cups 16 on the cross member 15, will be locked in position while the pins 17, entering the cups 16 on the front cross member 14, will both be free. Likewise, when the shaft 55 is turned in either direction, toward the left, for example, the locking members 52 and 69 are actuated toward the left. The member 52 enters the pin 17 at the left-hand end of the cross member 14. The member 69 was already in engagement with the pin 17 on the left-hand of the cross member 15 but its movement releases the pins 17 at the opposite end of the cross member 15, so that the body may be tilted about the pivot shafts 58 and 74 at the left-hand ends of the cross members 14 and 15.

The movement of the members 52 and 69 causes a similar movement of the inner ends of the side gate locking arm 66, the outer ends of which move in the opposite direction. The latter movement effects the locking of the side gate on the side of the body which is free to rise and releases the gates on the other side of the body so that they may be lowered as the body is tilted. This operation will be further described hereinafter.

The side gate operating and locking mechanism

Figure 10:
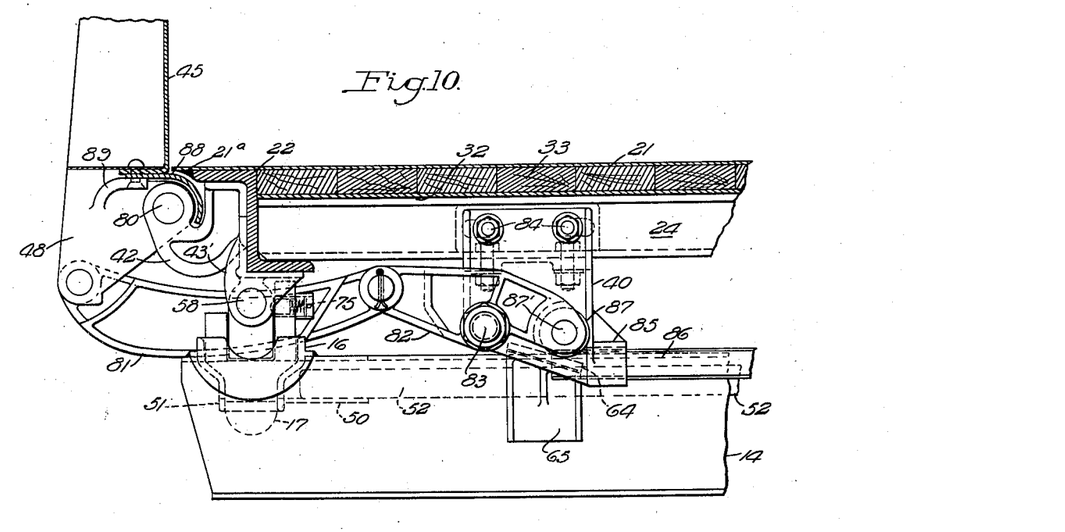
Figure 10 is an end elevation, partly broken away, of the mechanism for operating the side gates of the hoist body.

This structure is illustrated in Figs. 10, 12, 14 and 17. Fig. 10 illustrates how the operation of the side gate 45 is automatically effected when the truck body is tilted about the pivot shafts 58 and 74 at the left-hand ends of the cross members 14 and 15, and illustrates the appearance of the forward operating mechanism for the side gate 45 as it would appear to an observer looking toward the front of the truck. Similar gate operating means is provided adjacent the rear cross member 15.

As already pointed out, the side gate 45 is pivotally supported in bearings 42 secured to the side Z-bar 22 of the body bottom. The side gate 45 rotates in these bearings on pivot shafts 80. The downward projection 48 of the side gate 45 cooperates with a link 81, one end of which is pivotally secured to the projection 48 and the other end of which is pivoted to a bell crank 82, which is journalled on a pivot shaft 83 in the casting 40, which is secured to the intermediate transverse Z-bars 24 and 25, as explained in the description of Fig. 3. The casting 40 is secured to the Z-bar 25 by bolts 84 which pass through slots in the Z-bar and thus permit lateral adjustment of the casting. This adjustment makes it possible to insure that the side gate 45 will be completely closed when the truck body is horizontal.

In addition to providing a pivotal support for the shaft 83, the casting 40 carries a sleeve 85 for cooperation with a side gate locking bar 86, which is shown in detail in Fig. 17 and will be described more fully in connection therewith.

The free end of the bell crank 82 carries a roller 87 which engages the inclined cam surface 64. In the position shown in Fig. 10, the gate 45 is maintained vertical by the engagement of the roller 87 with the surface 64. With the bell crank 82 in the illustrated position, the link 81 forces the side gate 45 to the vertical.

Fig. 10 further illustrates the details of the body bottom, such as the false bottom 32, the planks constituting the wooden filler 33, and the floor sheet 21. Fig. 10 also shows a detail of the side gate 45 which prevents collection of the material being dumped, in the operating mechanism. This feature includes a curved guard plate 88. When the gate 45 is vertical, the plate 88 enters a curved recess in the bearing 42. When the gate is open, the plate 88 acts as a shield to prevent the material being dumped from collecting on the operating members. The plate 88 extends the length of the side gate 45 and is secured to lugs 89 on the projections 48.

The plate 88 makes it possible to use a square edge on the body sheet 21. Without the plate 88, it would be necessary to use a body sheet with a down-turned edge. It is much simpler, however, to bend the plate 88 to the required curvature than to bend the body sheet 21 to the same degree. The construction shown also affords a tighter joint when the gate is closed than it is possible to obtain with the known form of body sheet having curved edges.

The arrangement of the gate-operating cams, cranks and rollers is such as to eliminate excessive strains in any members and to reduce friction at the points of contact. The force is applied substantially tangentially of the cranks and axially of the links so that the maximum lever arms are obtained.

Figure 12:
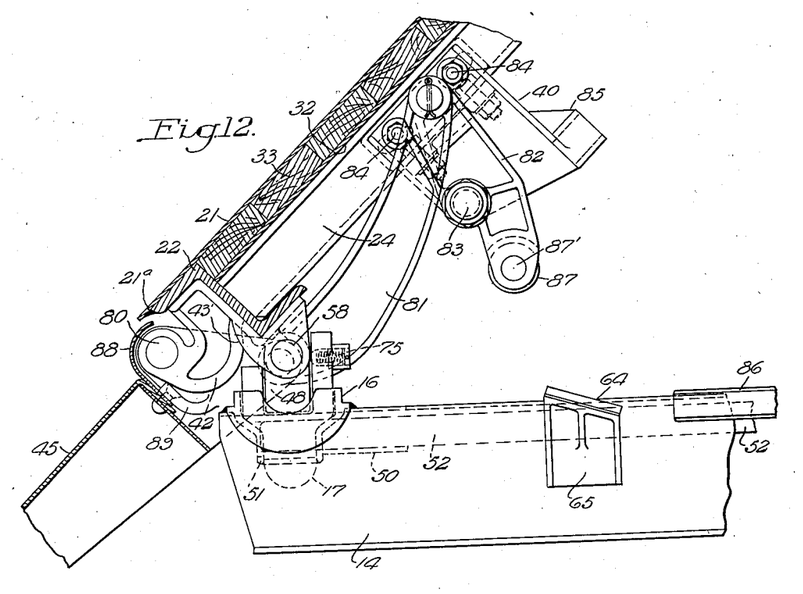
Figures 12 and 13 show the same structure as Figs. 10 and 11, except that it is shown in dumping position.

Fig. 12 illustrates the relative positions of the gate operating members when the truck body is tilted to the left side. As the body is hoisted, the roller 87 of the bell crank 82 rides up the inclined cam surface 64 as the pivot 83 for the bell crank rotates about the pivot shaft 58 in the hinge pin 17. It is to be understood that the locking bar 86 is withdrawn from its normal engagement with the bell crank 82 when the hinge pin 17 is locked in its cup 16. As the body is hoisted, the gate 45 tends to fall open by reason of its own weight. Its movement is limited, however, as long as the roller 87 engages the cam surface 64. At a predetermined angular position of the body, the roller 87 leaves the surface 64, and the gate 45 is free to move to its full open position, as illustrated in Fig. 12. The link 81 takes up a position determined by the movement of the bell crank 82 and the projection 48. The opening of the gate is arrested by the engagement of the projection 48 with the Z-bar 22.

When the body has been hoisted to the dumping position, as in Fig. 12, it will be obvious that a clear dumping surface is provided without any obstructions to prevent the flow of the contents of the truck. The plate 88 and the side gate 45 serve as a chute to direct the material being dumped away from the side of the truck. This is a marked advantage, since it makes it possible to dump the truck over the edge of a fill, for example, without making it necessary for the truck to stand on the very edge thereof.

Details of the side gate locking and operating mechanism are further illustrated in Fig. 14. This figure illustrates the mounting of the casting 40 on the Z-bars 24 and 25 and the manner in which the gate locking bar 86 is slidably mounted in the sleeve 85, which is integral with the casting 40. The pivot shaft 83 for the bell crank 82 and its bearing in the casting 40 are also shown in Fig. 14. The locking bar 86 is provided with a downward projection 90, which cooperates with a fork 91 at the end of the arm 66, the movement of which is controlled by the downward projection 70 on the hinge-pin locking bar 52. The bar 86 locks the side gates by engaging the end of a pin 87' on which the roller 87 is journalled.

Figure 17:
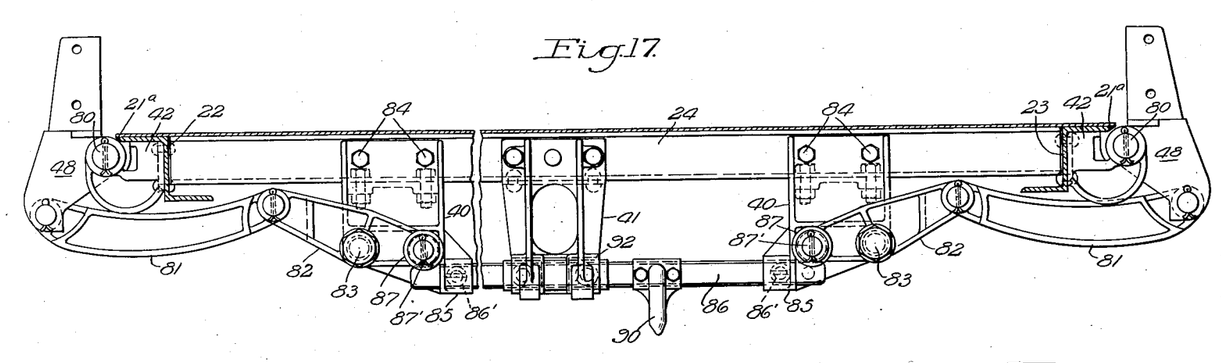
Figure 17 is a detail view showing in side elevation the side gate locking mechanism.

Fig. 17 is a side elevation of the side gate locking and operating mechanism from which the effect of the locking bar 86 may readily be observed. This bar is slidable in bearings 92, which are hung from the transverse Z-bar 24. It will be apparent from Fig. 17 that when the bar 86 is in its central or neutral position, its ends engage the pins 87' and prevent the rotation of the bell cranks 82. When the locking bar is moved transversely of its central position, one of the bell cranks is released by the movement of the end of the locking bar 86 out of engagement with the pin 87'. This permits the bell crank 82 to rotate as the body is hoisted, in accordance with the foregoing description. Spring pressed detents 86' are provided to lock the bar 86 in its adjusted positions.

The tail gate operating and locking mechanism

Figure 11:
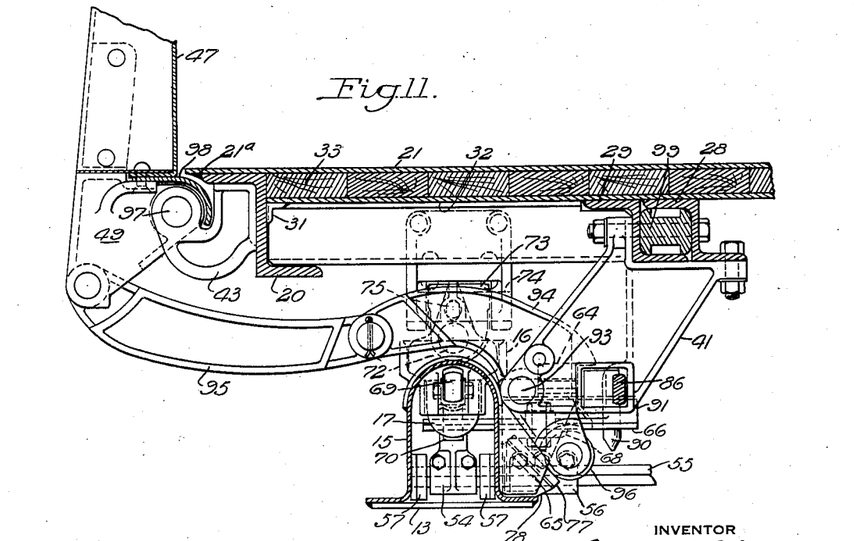
Figure 11 is a view similar to Fig. 10, showing the operating mechanism for the tail gate.

The means for operating and locking the tail gate are shown in Figs. 11, 13, 15, 16, and 18. Referring first to Fig. 11, it will be seen that the casting 41, which is secured to the Z-bars 28 and 29, affords a bearing for a pivot shaft 93. A bell crank 94 is rotatably mounted on this shaft and is pivotally connected to a link 95. The link 95 has a pivotal connection to the downward projection 49 of the tail gate 47. The bell crank 94 carries a roller 96, which is adapted to ride upon the inclined-cam surface 77, which is secured to the cross member 15 by means of a supporting bracket 78.

The casting 41 also provides a bearing for the sliding side gate locking rod 86, which is actuated by the movement of the locking bar for the rear hinge pins.

Figure 13:
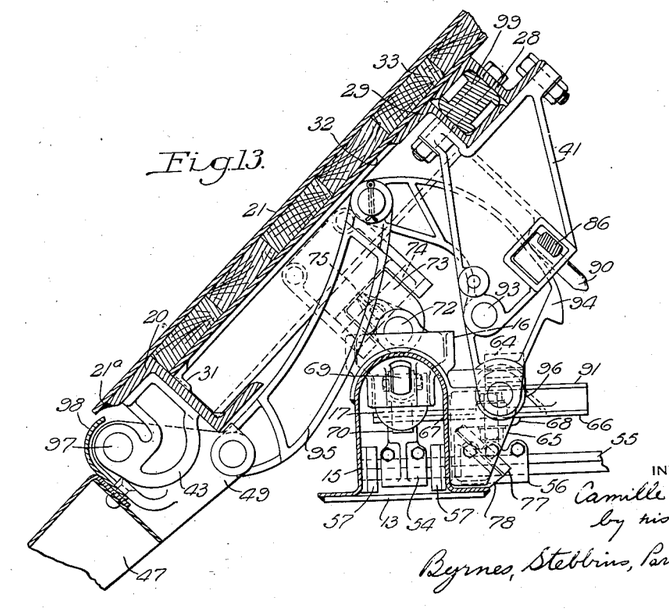

The position of the tail gate operating mechanism when the body is hoisted may be seen in Fig. 13. As the body pivots about the pivot shafts 72 of the rear hinge pins 17, the roller 96 rides up the cam surface 77 and permits the tail gate 47 to rotate about its pivotal mounting 97. The movement of the projection 49 forces the link 95 upward. The continued movement of the body causes the roller 96 to leave the surface 77 as the bell crank 94 is rotated further. When the body has reached its dumping position, the gate lies in a plane parallel to that of the body bottom, and the projection 49 engages the Z-bar 20. A curved plate 98 guides the dumped material from the body bottom to the tail gate in the manner explained in connection with the description of the side gate and its curved plate 88.

When the body is lowered, the roller 96 engages the surface 77 and, through the bell crank 94 and the link 95, forces the gate 47 to its normal, vertical position.

Fig. 15 illustrates the casting 41 in end elevation and shows how it is secured to the Z-bars 28 and 29. The structure of the bell crank 94 and its associated mechanism may also be seen in Fig. 15. A clamping block 99 is disposed between the Z-bars 28 and 29 and forms a rigid supporting means for the casting 41.

The tail gate 47 is provided with means for permitting it to be swung about its upper edge, as well as the pivotal mounting 97 at its lower edge. Means are also provided for rendering the lower pivotal mounting ineffective to permit the gate to swing about its upper edge. These means are illustrated in detail in Figs. 16 and 18. The pivotal mountings 97, for the tail gate 47, are short pins passing through the downward projections 49 on the tail gate. These pins are secured by means of collars 99' to a shaft 100, which is slidably mounted in the bearing brackets 43 for the tail gate. The sliding shaft 100 has a rack bar 101 secured thereto for cooperation with a gear segment 102. The segment 102 is journalled on a shaft 103 and has an operating lever 104. The shaft 103 rotates in a bushing 104' which is secured to the lower flange of the rear Z-bar 20. A spring 105 causes the segment 102 to engage the sleeve 103 with sufficient friction to maintain the segment in its adjusted position.

Referring again to Fig. 2, the means for permitting the tail gate to swing about its upper edge include the spring-pressed plungers 106, which slide in recesses in the upper edge of the tail gate. Cooperating holes 107 in the side gates are provided for receiving these plungers when they are released. The plungers have operating handles 108. These handles are adapted to engage locking lugs on the tail gate when it is desired to rotate the latter about its lower edge. When it is desired that the tail gate swing about its upper edge, the handles 108 are turned so as to permit the plungers 106 to enter the holes 107. The handle 104 is operated to shift the sliding bar 100 to the left, as shown in Fig. 18, by means of the segment 102 and the rack bar 101 to withdraw the pins 97 from the bearing brackets 43.

It is also necessary to remove the pivotal connection between the link 95 and the projection 49. This is accomplished by removing cotter-pins in the pivot shaft connecting these members. The lower edge of the tail gate is now free to swing about its upper edge as an axis.

Figure 22:
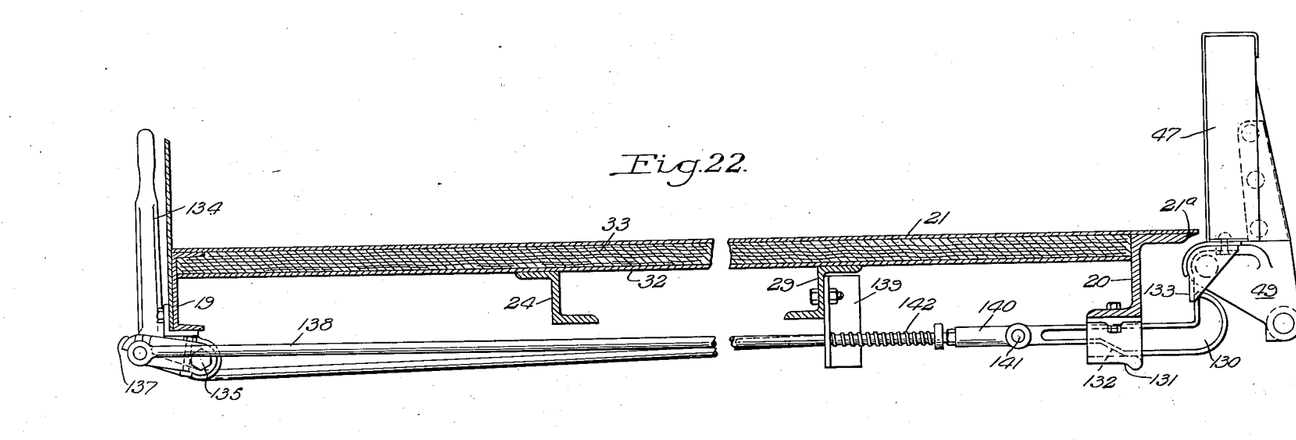
Figure 22 is a partial side elevation of the body showing the locking means for the tail gate.
Figure 23:
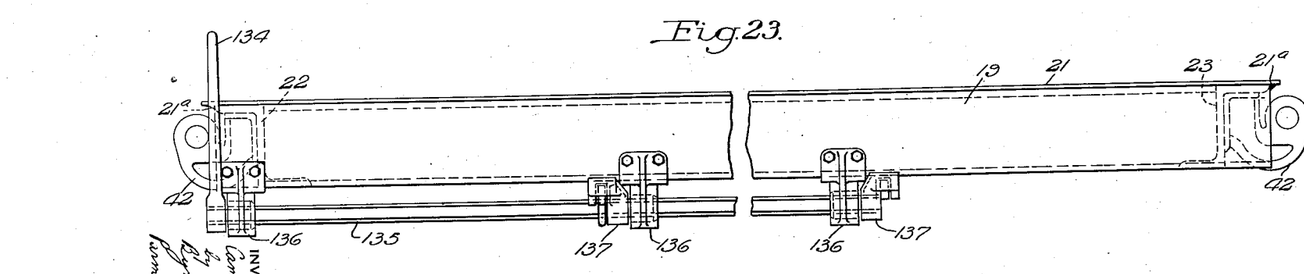
Figure 23 is an end view of Fig. 22, looking on the right-hand end thereof.

When the above-mentioned adjustments have been made and the gate is pivoted about its upper edge, it is obvious that some means are required for locking the gate in its closed position to prevent the opening thereof, due to the vibration of the body resulting from the movement of the vehicle. The means I have provided for this purpose are illustrated in Figs. 22 and 23 and include a pair of hooks 130, which are slidably mounted in bearings 131 bolted to the lower flange of the rear Z-bar 20 of the body bottom. The hooks 130 are slidable longitudinally in the bearings 131 and are provided with cam surfaces 132, which cause a vertical shift of the hooks when the latter are moved longitudinally. The hooks 130 engage a bracket 133 secured to the lower edge of the tail gate 47.

A lever 134 is keyed to a shaft 135, which is journalled in bearings 136. The bearings 136 are bolted to the channel 19 at the head end of the body bottom, and the lever 134 is positioned at the end of the shaft 135 adjacent the edge of the body bottom. The shaft 135 is provided with a pair of crank arms 137, which are keyed thereto. Rods 138 are connected to the cranks and are arranged to slide in a bearing bracket 139 bolted to the transverse Z-bar 29. The rods 138 have adjustable threaded connections with sockets 140, which are pivoted to the ends of the hooks 130 at 141. Compression springs 142 serve to urge the rods 138 and the hooks 130 toward their extreme rear position.

When the elements are in the position illustrated in Fig. 22, the hooks 130 engage the bracket 133 to maintain the gate 47 in the closed position. When the body is to be dumped to the rear, the lever 134 is rotated in a counter clockwise direction. The resulting movement of the cranks 137 slides the rods 138 to the rear, and this movement is assisted by the compression springs 142. As the hooks 130 are moved rearwardly, they are shifted vertically to release the bracket 133 as the cam surface 132 rides past the rear edge of the bearings 131. When the body is subsequently tilted about its rear cross member, the gate 47 swings open about its upper pivots. Any suitable means, such as a chain or link, may be provided for limiting the outward movement of the gate. When the dumping has been effected and the body lowered to its normal position, the tail gate may be secured to the body by restoring the lever 134 to its original position. As a result of this movement of the lever 134, the rods 138 are drawn forward against the force exerted by the springs 142. As the cam surfaces 132 of the hooks 130 slide into the bearings 131, in the forward movement of the hooks, the latter engage the bracket 133 and secure the gate in closed position. The cranks 137 and the rods 138 constitute a toggle mechanism, so that there is no tendency for the gate to be released.

The locking mechanism just described is ineffective when the tail gate is rotated about its lower edge, but causes no interference with such movement of the gate.

The hoist mechanism

The structure of the hoisting mechanism is shown in Figs. 19 and 20. This mechanism comprises a multiple cylinder, indicated generally at 109. This cylinder consists of an outer cylinder 110 and three inner cylinders 111, 112, and 113. The cylinders are adapted to slide longitudinally, each within the other. The cylinder 109 is supported from the longitudinal channels 10 of the truck by means of a trunnion block 114. The trunnion block is adapted to afford a journal bearing for the cylinder 109, which is provided with studs 115. One of the studs 115 is hollow and is provided with a connection 116 for cooperating with a fluid supply pipe. The trunnion block 114 is rotatably supported in adjustable bearing blocks 117. These blocks have teeth for engaging the toothed surfaces of cooperating bearing blocks 118, which are bolted to the truck channels 10, the securing bolts passing through both the blocks 117 and 118. The toothed surfaces on the bearing blocks permit the vertical adjustment of the trunnion block 114 so that the hoisting mechanism may be applied to trucks of different dimensions.

The upper end of the cylinder 113 has a head 119, which has a pivotal connection with an upper trunnion block 120. The trunnion block 120 is pivotally supported in bearing blocks 121, which are bolted to the structural members 34 and 35, shown in Fig. 3. The cylinder 109 thus has provision for universal movement with respect to the truck body and the truck chassis.

The inner cylinders 111, 112, and 113 of the multiple cylinder 109 have collars 122 at their lower ends and packing rings 123 adjacent their upper ends. The collars 122 have axial slots (not shown) to permit the passage of fluid. The hoisting mechanism, shown in Figs. 19 and 20, is adapted to be operated by any source of fluid pressure and may conveniently be provided with a power take-off mechanism, as shown in my copending application, Serial No. 229,564, filed October 29, 1927.

When fluid under pressure is supplied to the connection 116, it traverses the hollow stud 115 and fills the space between the outer cylinder 110 and the first inner cylinder 111. The fluid then traverses the axial slots in the collar 122 on the bottom of the cylinder 111 and flows into the innermost cylinder 113. When the cylinder 113 has been filled with fluid, continued application of pressure causes this cylinder to rise within cylinder 112 until the collar at its bottom engages the packing ring 123, adjacent the upper end of the cylinder 112. At this time, the cylinders 112 and 113 move together, the latter sliding within the cylinder 111 until its bottom collar engages the packing ring 123 adjacent the upper end of the cylinder 111. Thereafter the three cylinders 111, 112, and 113 continue to rise within the cylinder 110 until the collar 122 at the bottom of cylinder 111 engages the packing ring 123 near the top of the cylinder 110. This represents the extreme limit of extension of the multiple cylinder 109.

As the cylinder 109 is extended, the truck body is hoisted, tilting about either of its dumping axes, and the cylinder itself pivots on its trunnions as the angular position of the body changes. The thrust exerted by the cylinder 109 is applied substantially at the center of the truck body, so that the latter may be dumped in any direction with equal facility. The mounting of the cylinder 109 is strong and rigid and transmits the lifting effort directly to the truck chassis.

It will be apparent from the foregoing description that the hoist body which I have provided for vehicles embodies numerous advantages over structures of similar type which have been known heretofore. The elimination of the usual corner posts contributes largely to the successful operation of the dumping body. The novel construction of the bottom of the body is also important. I preferably reinforce the edge of the floor sheet at the point where it engages the rear Z-bars, as well as the side Z-bars, by welding these elements together at their intersection. This reinforcing weld eliminates battering of the edges of the body sheet. The wooden filler between the body sheet and the false bottom takes up the shock of loads dropped onto the body and prevents battering of the central portion of the floor or body sheet. The flat surface of the body sheet is thus preserved and any denting which would prevent thorough dumping of the truck is eliminated. Other advantages of the present structure have been mentioned in the description, or will be obvious from a consideration of the latter.

Although I have illustrated and described but a single present preferred embodiment of the invention, it will be understood that it may be practiced in forms other than that shown. For this reason, I do not intend to be limited to the structure illustrated, except as necessitated by the scope of the appended claims, and any changes that may be made without departing from the spirit of the invention are to be considered as part thereof.

I claim:

1. In a tilting vehicle body, four releasable hinge joints receivable in cross members resting on the vehicle frame, bars slidable in said members for locking said joints, gates pivoted to the body, and operating mechanism therefor, a locking bar for the gates slidably carried by the body, a lever pivoted on a projection from one of said members, a pivotal connection between the lever and a joint locking bar, and a connection between the lever and the gate-locking bar.

2. In a tilting body for vehicles, a pair of cross members, hinge joints thereon for tiltably supporting the body, downfolding side and end gates for the body, and operating mechanisms for each gate including a bell crank pivoted to the body, a link connecting the crank to a gate, a roller on the crank and a stationary cam on one of said cross members in the path of said roller, a transversely slidable bar in said member for locking said joints, a transversely slidable bar carried below the body for locking all the gates except that on the side at which the joints are locked, and a lever pivoted on a projection from one of said members so as to be operated by one of said locking bars for shifting the gate locking bar in a direction opposite that of the first-mentioned bar.

3. In a tilting body for vehicles, a pair of cross members, hinge joints thereon for tiltably supporting the body, downfolding side and end gates for the body, and operating mechanisms for each gate including a bell crank pivoted to the body, a link connecting the crank to a gate, a roller on the crank and a stationary cam on one of said cross members in the path of said roller, a transversely slidable bar in said member for locking said joints, a transversely slidable bar carried below the body for locking all the gates except that on the side at which the joints are locked and a lever pivoted on a projection from one of said members for angular movement in a horizontal plane to shift the last-mentioned bar in a direction opposite that of the first-mentioned bar, and means for actuating said first-mentioned bar including a rack thereon, a gear segment meshing therewith and a shaft for supporting and actuating the segments.

4. In a vehicle, a frame, bolsters extending thereacross, a body supported above said bolsters, means projecting downwardly from said body into said bolsters, locking bars movable axially in said bolsters for locking opposite sides of the body to the frame, vertical sides for said body pivoted adjacent their bottom edges for outward and downward movement, locking means for said sides including a transversely sliding bar operated by said locking bars for locking all said sides except that side on which the body is locked to the frame, and a pivoted lever on one of said bolsters extending between the transversely sliding bar and one of said locking bars, operating means for each of said pivoted sides including a bell crank pivoted to the body, a link between the crank and the side, and a cam on one of said bolsters for cooperating with the bell crank to operate the side.

5. In a vehicle, a frame, bolsters extending thereacross, a body supported on said bolsters, hinge pins extending downwardly from said body into said bolsters, locking bars inside said bolsters for axial movement, to lock selected pairs of said pins to said bolsters, a rack on said bars and segments for engaging said racks to shift the bars, said segments being mounted on a longitudinal rocking shaft, downfolding gates for the body, means for selectively locking all of said sides except that on the side of the body which is locked to the frame, said locking means including a transversely sliding bar and a lever pivoted on one of said bolsters having operative connection with said last-mentioned bar and one of said locking bars, and operating means for each of said gates including a bell crank pivoted to the body, a link between the crank and its gate, and a cam on one of said bolsters for cooperating with the bell crank to operate the gate.

CAMILLE P. GALANOT.